June 16, 1931.  H. PAPST  1,810,056

ROTOR FOR ASYNCHRONOUS ALTERNATING CURRENT MOTORS

Filed Sept. 29, 1930

INVENTOR
Hermann Papst
BY
ATTORNEY

Patented June 16, 1931

1,810,056

UNITED STATES PATENT OFFICE

HERMANN PAPST, OF ST. GEORGEN, SCHWARZWALD, GERMANY

ROTOR FOR ASYNCHRONOUS ALTERNATING CURRENT MOTORS

Application filed September 29, 1930, Serial No. 485,164, and in Germany October 5, 1929.

This invention relates to rotors for asynchronous alterating current motors, and in particular to those of the squirrel cage type for small motors, such for example, as those used to drive gramophones and like machines.

Hitherto it has been the practice to make the rotors or armatures of the type referred to, in the form of cylindrical bodies or cores with perforations, but it has not been possible to obtain an adequate torque or a sufficient number of revolutions in small motors of this kind.

According to the present invention the drawback is overcome by constructing the rotor or armature of cylindrical form with slits arranged parallel with its axis, the bars, separated by the slits being alternately connected in parallel with each other in two groups.

In carrying out this invention the rotor is formed as a bell with two bottoms suitably insulated from each other, the alternate bars being connected to the inner and outer bottoms respectively.

In the accompanying drawings which illustrates an example of this invention:—

Figure 1:
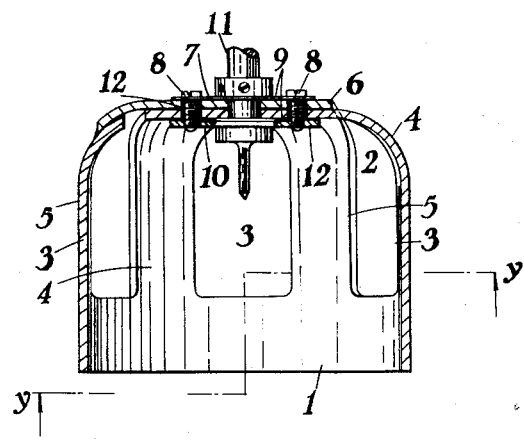
Figure 1 is a section on line $x$—$x$ of Figure 2.
Figure 2:
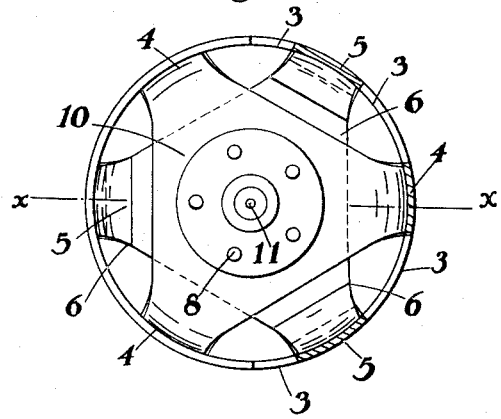
Figure 2 is an underneath plan, partly in section, on line $y$—$y$ of Figure 1.

As shown in the drawings, the rotor is formed as a bell having a cylindrical part 1 and a bottom 2. The cylindrical part 1 is provided with a plurality of slits or apertures 3 thereby forming a plurality of equally spaced bars 4 and 5. The bars 4 are left intact with the bottom 2 but the bars 5 are severed from the bottom 2 and the free ends thereof are soldered or otherwise secured to a second or outer bottom 6 separated from the bottom 2 by a layer of insulating material 7, the bottoms 2 and 6 being held rigidly together by screws 8 passing through insulating plates 9 into a plate 10 secured on the spindle 11, the screws 8 being insulated from the bottoms 2 and 6 by insulating sleeves 12.

What I claim is:—

1. A rotor for asynchronous alternating current motors of the character described, comprising a cylindrical body having slits therein arranged parallel to the longitudinal axis of said body to constitute a plurality of equally spaced bars separated by the slits, said bars being alternately connected in parallel with each other in two groups.

2. A rotor for asynchronous alternating current motors of the character described, comprising a cylindrical body having slits therein arranged parallel to the longitudinal axis of said body to constitute groups of equally spaced bars separated by the slits, the bars of one group being alternately connected to the bars of another group to constitute a bell with two bottoms.

3. A rotor for asynchronous alternating current motors of the character described, comprising a cylindrical body having slits therein arranged parallel to the longitudinal axis of said body to constitute groups of equally spaced bars separated by the slits, said groups of bars being connected together to constitute a bell with two bottoms insulated from each other, alternate bars of the groups being connected to the inner and outer bottoms respectively.

4. A rotor for asynchronous alternating current motors of the character described, comprising a cylindrical body having slits therein arranged parallel to the longitudinal axis of said body to constitute groups of equally spaced bars separated by the slits, said groups of bars being connected together to constitute a bell with an inner and outer bottom, means for insulating said bottoms one from the other and securing the bottoms together, said means including an insulating plate between said bottoms and screws engaging insulating plates on either side of the bottoms, said screws passing through and being insulated from the bottoms by insulating sleeves.

HERMANN PAPST.